(12) United States Patent
Selvaraj et al.

(10) Patent No.: US 12,335,261 B2
(45) Date of Patent: Jun. 17, 2025

(54) SECURE AUTHENTICATION AND INTEROPERABILITY MODEL FOR MACHINE TO MACHINE ("M2M") COMMUNICATION

(71) Applicant: Bank of America Corporation, Charlotte, NC (US)

(72) Inventors: Srinivasan Selvaraj, Tamil Nadu (IN); Ananda Raj, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 151 days.

(21) Appl. No.: 18/380,271

(22) Filed: Oct. 16, 2023

(65) Prior Publication Data
US 2025/0126118 A1   Apr. 17, 2025

(51) Int. Cl.
*H04L 9/40* (2022.01)

(52) U.S. Cl.
CPC ...... *H04L 63/0876* (2013.01); *H04L 63/0442* (2013.01); *H04L 63/20* (2013.01)

(58) Field of Classification Search
CPC .. H04L 63/0876; H04L 63/0442; H04L 63/20
USPC ..................... 726/4; 709/223, 224
See application file for complete search history.

(56) References Cited

U.S. PATENT DOCUMENTS

| | | | |
|---|---|---|---|
| 2005/0216956 A1* | 9/2005 | Orr | H04L 63/1441 726/23 |
| 2013/0091267 A1* | 4/2013 | Urban | H04L 41/12 709/224 |
| 2014/0280865 A1* | 9/2014 | Albertson | H04W 4/023 709/224 |
| 2018/0183650 A1* | 6/2018 | Zhang | H04W 72/21 |
| 2023/0217310 A1* | 7/2023 | Zhang | H04W 40/18 370/252 |

* cited by examiner

*Primary Examiner* — Liang Che A Wang
(74) *Attorney, Agent, or Firm* — Weiss & Arons LLP

(57) ABSTRACT

A network of nodes supporting machine to machine ("M2M") communication within the network is provided. Each of a plurality of nodes within the networks may be in an inactive communication state prior to authentication. The authentication may be performed by a remote central node ("RCN"). The RCN may be configured to control authentication and communication between nodes in the network. The RCN may perform one, two or more methods of authentication to securely authenticate each node. Following authentication, the RCN may generate network protocol for data payloads transmitted within the network. The RCN may further be configured to store data transmitted between nodes and maintain or delete the data based on a level of privacy that may be tagged to the stored data.

20 Claims, 5 Drawing Sheets

SECURE AUTHENTICATION AND INTEROPERABILITY MODEL FOR MACHINE TO MACHINE ("M2M") COMMUNICATION

FIELD OF TECHNOLOGY

Aspects of the disclosure relate to secure authentication between devices in a network.

BACKGROUND OF THE DISCLOSURE

Machine to machine ("M2M") communication includes the direct communication between device nodes either in wired or wireless mediums. Such communication is becoming increasingly widespread, as it allows for multiple devices to communicate directly with each other without needing an intermediary human or programmed device.

While M2M is both desirable and efficient, such modes of communication include inherent drawbacks. The lack of having a centralized node in control of the communications may result in unsecure or, in some instances, undesirable communications.

It would be desirable, therefore, to provide an M2M communication system that leverages the advantages of M2M communications while adding an oversight layer to ensure that the communications meet and are in compliance with industry and any other required standards.

It would be further desirable to provide an M2M communication system that supports an architecture including a large number of M2M devices.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
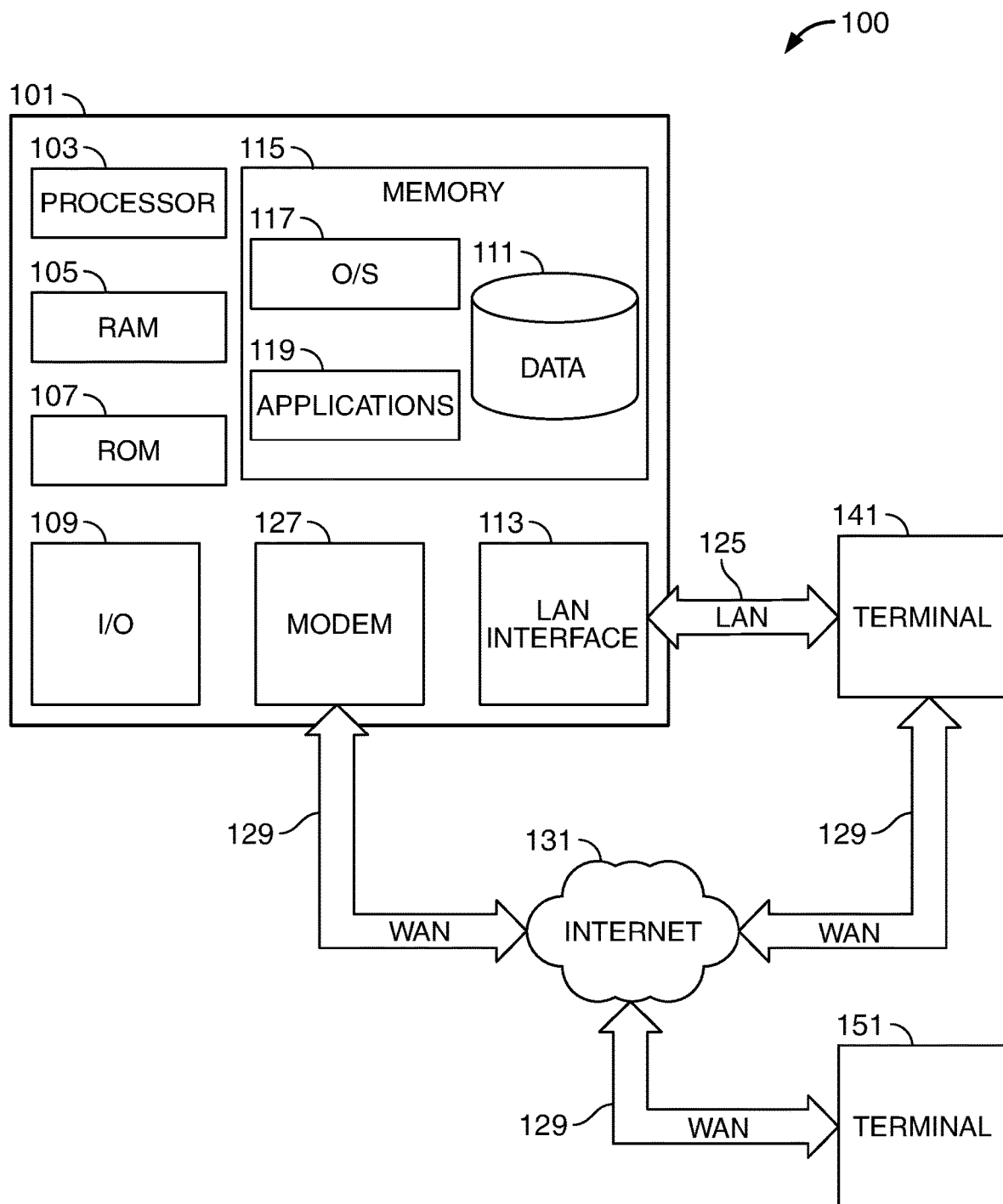
FIG. 1 shows an illustrative block diagram in accordance with principles of the disclosure.

A network of nodes supporting machine to machine ("M2M") communication within the network is provided. The network may include a plurality of nodes.

Each node may be a computing device. In some embodiments, each node in the plurality of nodes may be an internet of things ("IoT") device.

The plurality of nodes may include a first node. Each node may be in an inactive communication state for communicating with one or more of the plurality of nodes prior to authentication of each node with a remote central node ("RCN").

The RCN may be the central hub for managing all the nodes. The RCN may be configured to control authentication and communication between the first node and the remaining nodes in the plurality of nodes. The RCN may be configured to store data for each of the nodes. The RCN may store the data in an RCN database for short periods of time. The RCN may store the data for longer periods of time.

Each node may need to be triggered to an active communication state. The node may be enabled to switch to an active state following authentication by the RCN.

Each node may be authenticated for verification as a node in the network prior to communicating with another node in the network.

At an authentication phase of the first node, the RCN may be configured to receive a frequency signature from the first node in order to determine authenticity. The network may set a network frequency signature that may be known to each node within the network. If the frequency signature received does not match the node, this may be an indication of an unidentified node attempting to communicate within the network.

The frequency signature may be associated with a time stamp. The frequency signature may be associated with a known variable. The frequency signature may be associated with a radio frequency identification ("RFID") tag. The frequency signature may be a time stamp. The frequency signature may be a known variable.

In some embodiments, an unidentified node may be a malicious node. When the node is not a malicious node, the unidentified node may be enabled to perform additional methods of authentication to be identified.

The RCN may be configured to verify that the frequency signature corresponds to the network frequency signature.

In response to the verifying, the RCN may be configured to authenticate the first node.

Prior to enabling communication between the first node and a second node, the RCN may be configured to perform a pre-communication phase following the authentication phase. This may be an additional form of authenticating the node.

The RCN may be configured to receive a data packet. The data packet may include a data payload from the first node. The data packet may also include a frame format. The RCN may be configured to verify that the frame format corresponds to a network frame format.

In response to the verifying, the RCN may be configured to transmit a communication network protocol to the first node. The communication network protocol may include a start bit position, a length of the data payload and a mode of data segregation.

Additionally, the RCN may be configured to transmit an activation key to the first node. The activation key may trigger a switch of the first node from the inactive communication state to an active communication state.

At a communication phase, following the pre-communication phase, the first node may be configured to transmit a communication request from the first node to a second node. The second node may be included in the plurality of nodes. The communication request may include the activation key.

At the communication phase, the second node may be in the inactive communication state. The second node may be configured to receive the communication request from the first node. The second node may be configured to transmit the activation key to the RCN for verification.

In response to a receipt of verification from the RCN, the second node may be in the active communication state. The second node may be configured to establish the communication with the first node.

The RCN may be further configured to, at a disconnect phase following the communication phase, receive from the first node a disconnect signal. A flag including a data privacy level of the data transmitted in the data payload may also be received from the first node.

When the privacy level is greater than a pre-determined threshold, the RCN may be configured to delete the data from the RCN database.

When the privacy level is less than the pre-determined threshold, the RCN may be configured to store the data in the RCN database for a pre-determined time period.

The RCN may further be configured to switch a state of the first node and the second node from the active communication state to the inactive communication state.

In some embodiments, the first node may be configured to maintain the active communication state for a pre-determined duration of time.

Following the pre-determined duration of time, the first node may be automatically reverted to the inactive communication state. The pre-determined duration of time may be a few seconds, one minute, five minutes, a 24-hour period of time, or any other suitable duration of time.

In some embodiments, when the frequency signature does not correspond to the networks frequency signature, the RCN may be configured to deny communication with the first node.

Prior to denying communication with the first node, the RCN may be further configured to identify a MAC address of the first node.

The RCN may further identify a unique identifier ("ID") for the first node, store the unique ID and MAC address in the RCN database and flag the unique ID and MAC address as an unidentifiable node.

Following a lapse of the pre-determined period of storing the data in the RCN database, the RCN may be configured to delete the data from the RCN database and transmit the data to a cloud server for permanent data storage.

In some embodiments, when the first node is in the active communication state, the first node may be enabled to communicate with the second node. In some embodiments, the first node may be enabled to communicate with each of the plurality of nodes in the network.

It should be appreciated that the network frame format is a format generated by the network for use in communication between each of the plurality of nodes.

A plurality of networks supporting M2M communication is provided. Each of the plurality of networks may include a plurality of nodes.

The plurality of networks may include a first network. The first network may include a first plurality of nodes.

The plurality of networks may include a second network. The second network may include a second plurality of nodes.

The plurality of networks may include a third network. The third network may include a third plurality of nodes.

Each network may include an RCN. Each RCN may be associated with one network. Each RCN may be configured to authenticate each node within its network prior to communicating with a node from another network.

A CRM node may be a central node operating as a gateway between the plurality of networks. The CRM node may be configured for authenticating each RCN.

A node from one network may communicate with a node from a second network. Prior to establishing communication between nodes from different networks, the CRM node may authenticate each node via the RCN associated with the network.

Prior to a second node from the second network receiving and acknowledging a communication transmitted by a first node from the first network, the first RCN from the first network may be configured to authenticate the first node.

The authenticating by the first RCN may include, at an authentication phase of the first node, receiving a frequency signature from the first node. The authenticating may further include verifying that the frequency signature corresponds to a network frequency signature of the first network. In response to the verifying, the first node may be authenticated via the first RCN.

At a pre-communication phase following the authentication phase, the RCN may be configured to receive a data payload from the first node. The data payload may include a frame format.

The RCN may be configured to verify that the frame format corresponds to a network frame format of the first network. The network frame format may include one or more specifications associated with data packets.

The frame format may include but may not be limited to, specifications associated with any one or more of a version of the header, the length of the header (internet header), a type of service, control flags, fragment offset, a time to live ("TTL"), source and destination address, and/or any other suitable specifications.

In response to the verifying, the first RCN may be configured to transmit a communication network protocol to the first node. The communication network protocol may correspond to the network frame format. The communication network protocol may include a start bit position, a length of the data payload and a mode of data segregation.

The first RCN may be configured to transmit an activation key to the first node. The activation key may trigger a switch of the first node from an inactive communication state to an active communication state.

The first RCN may then be configured to transmit the data payload and first RCN identifying data to the CRM node. The CRM node may retrieve the data payload and the first RCN identifying data and authenticate the first RCN.

It should be appreciated that systems and methods performed for authenticating a node in the network via the RCN may be used for authenticating the first RCN, a second RCN of the second network and/or a third RCN of the third network, via the CRM node.

In response to the authenticating of the first RCN, the CRM node may be configured to transmit node identifying data of a second RCN associated with the second node to the first RCN.

The first RCN, following receipt of the node identifying data, may be configured to transmit the data payload to the second RCN for transmittal to the second node.

Following receipt of the data payload at the second node, communication between the first node and the second node may be established.

In some embodiments, the authenticating of the first RCN via the CRM node may include running an asymmetric key algorithm to verify the first RCN. An example of the asymmetric key algorithm that may be utilized may be the RSA algorithm.

Nodes, in accordance with principles of the disclosure, may be any suitable size. For example, nodes may be a few millimeters in size. Nodes may be deployed in a wide variety of locations. For example, sensors may be deployed in military battlefields, industrial plants, in orchards, assisted living homes, in clothing, automobiles, smartphones, jewelry, or refrigerators. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects. For example, actuators may dim a light bulb, open a door, change a setting and/or any other suitable functionality.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using M2M protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data depository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more RFID tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Such nodes may move in or out of a network. Nodes within a geographic area may be grouped based on their presence within the geographic area. Nodes may be grouped based on their expected trajectory. Nodes may be grouped based on whether they are resource consumer or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip ("SoC") architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed on a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted enroute to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing exposure of such data to security threats.

For example, network of security cameras (e.g., sensor nodes) may generate large amounts of video data. Transmitting such large amounts of data to a cloud computing environment may utilize significant bandwidth-possibly preventing the cloud computing environment from timely receiving other data. Edge-nodes may analyze the video data at the source, before transmitting the data to the cloud computing environment. The analysis by the edge-nodes may identify "important" video data and discard the rest. Only the important video data may be transmitted to the cloud computing environment, reducing network congestion.

Often instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust affordable communication infrastructure. Incorporating edge-nodes may allow networks associated with these industries to process data without robust communication infrastructure.

Smartphones may not have access to a data connection. Edge-nodes may allow a cached version of a website to be opened on a smartphone, without an internet connection. Data may be entered into the website and changes saved locally to the edge-node (e.g., the smartphone itself). The edge-node may synchronize changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

An edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices;

a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

An edge-node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The communication circuit may include the modem. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN") and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

An edge-node may receive data in real-time or at predefined intervals, such as once a day. The edge-node may filter data captured by one or more nodes. The edge-node may repackage or reformat captured data. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

An edge-node may perform pattern recognition to identify correlations and trends in captured data. The correlations and trends may indicate expected or current resource consumption. The edge-nodes may redistribute resources based on expected resource usage. The edge-nodes may route resources consumers (e.g., customers) to a location that has available resources to service the consumption.

The edge-node may evaluate a cost of obtaining authentication credentials. "Costs" may be monetary (e.g., labor costs or infrastructure costs), time-related or related to a level of intrusion needed to obtain desired credentials.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a sensor may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a node may respond slowly if the node transmits a large amount of captured data. If transmitted all at once, the large amount of information transmitted by the node, together with other informational traffic traveling on a shared communication pathway, may be close to, or exceed bandwidth of the communication pathway. As a result, the network may become congested and other nodes on the network may be unable to transmit time-sensitive captured data in a timely manner.

Data travelling within a network to/from nodes may be routed along multiple communication pathways until the transmitted information reaches a desired destination node (e.g., a cloud computing environment). Each communication pathway may service a number of connected nodes and a respective volume of informational traffic.

It may be difficult to ascertain available bandwidth on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. Edge-node may be configured to manage data transmission of other nodes to reduce network congestion. For example, an edge-node may perform pattern recognition to estimate costs of obtaining data from a node on a network.

Examples of edge-nodes may include mobile devices, tablets, smart watches, security cameras, doorbells, payment instruments, cars, glasses, keys and any other suitable edge-node. Each edge-node may include a processor, a sensor, communication capabilities and any other suitable components.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein. Computer 101 may include any one or more nodes in a network, neighboring network, the RCN and the CRM node. Computer 101 may include any one or more mobile devices of the user. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include an environment 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within the smart card, the POS device and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include the developer application, the production application and any other application described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
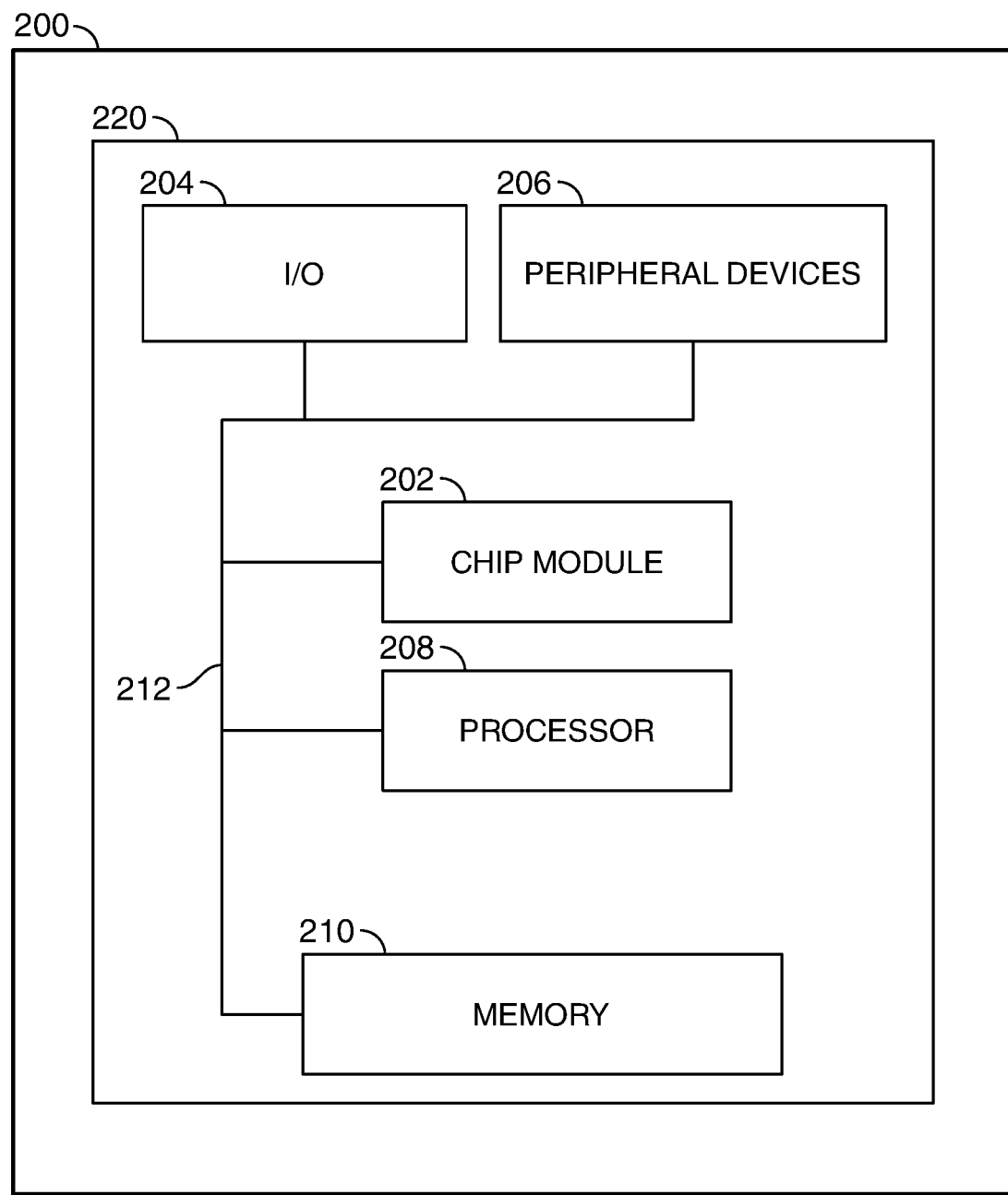
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data, and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
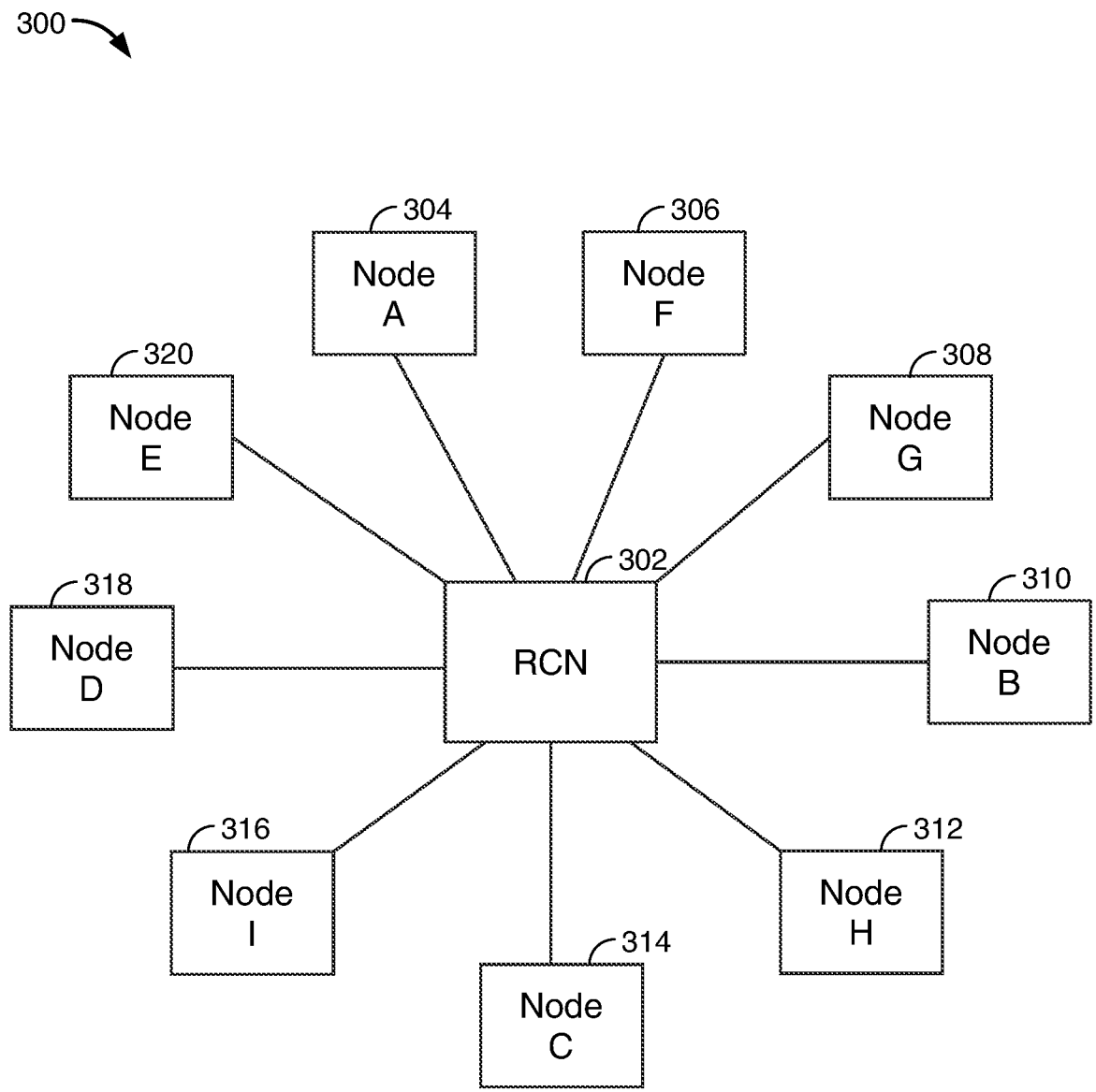
FIG. 3 shows an illustrative diagram in accordance with principles of the disclosure.

FIG. 3 shows an illustrative diagram of a network of nodes 300 in accordance with principles of the disclosure.

Each node within the network of nodes may be enabled to communicate with the remaining nodes in the network. The communication may be enabled following authentication of the node at the RCN 302.

In this illustrative diagram 300, the nodes may include node 'A' 304, node 'F' 306, node 'G' 308, node 'B' 310, node H '312', node 'C' 314, node 'I' 316, node 'D' 318 and node 'E' 320.

RCN 302 may be the gateway for communication between the nodes. RCN 302 may include an RCN database. The RCN database may operate as a storage medium of data transmitted between nodes. The data stored may include sensitive, private data transmitted within the network and/or outside the network.

RCN 302 may also operate as a gateway for communication for nodes within the network to a node in a neighboring network.

For example, when node 'A' 304 needs to communicate with another node in the network, node 'A' may need to first be authenticated via RCN 304. Once authenticated, node 'A' 304 may be enabled to communicate for the pre-determined duration of time.

Figure 4:
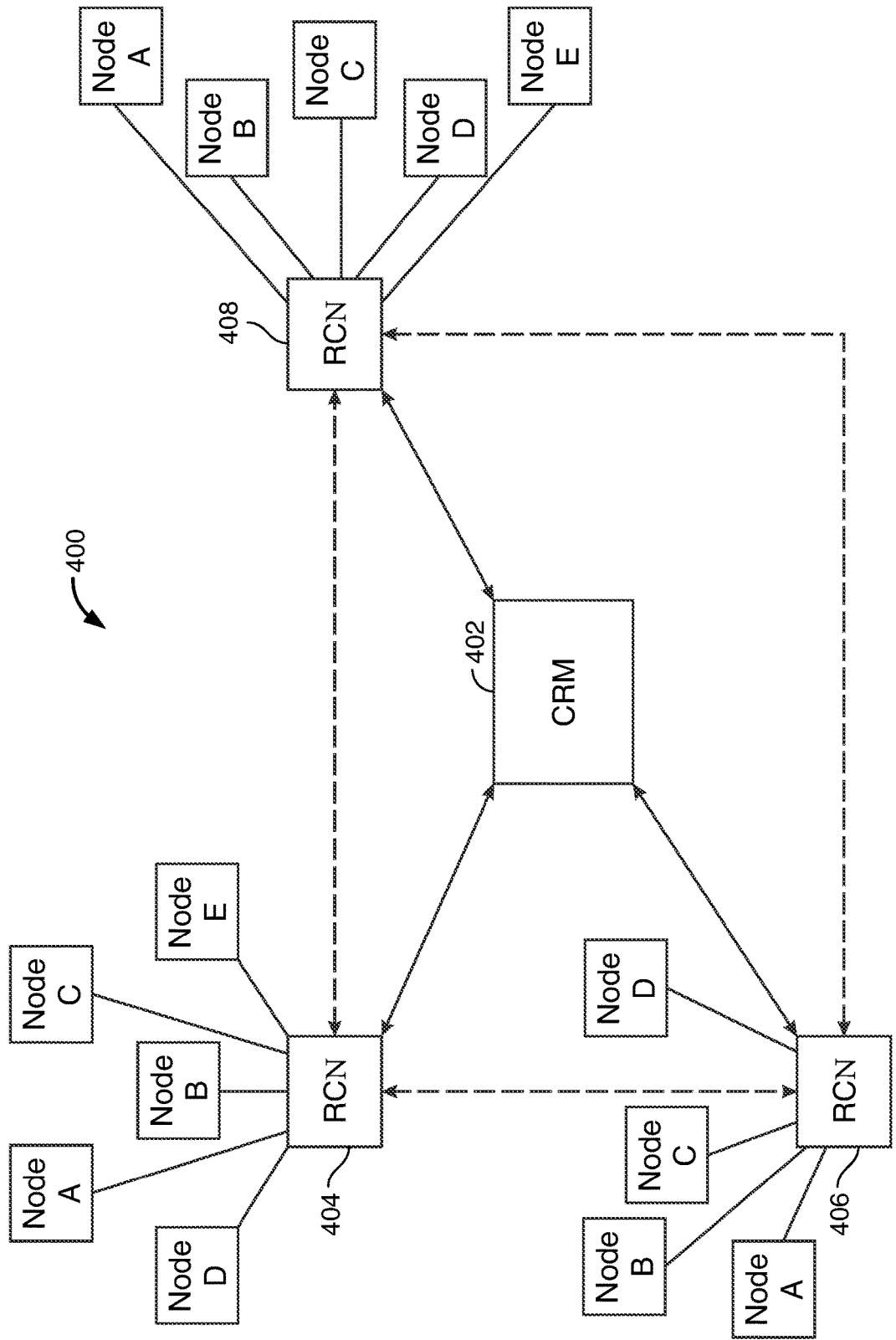
FIG. 4 shows an illustrative diagram in accordance with principles of the disclosure.

FIG. 4 shows an illustrative diagram of a plurality of networks 400 in accordance with principles of the disclosure. Each of the plurality of networks may include a plurality of nodes.

Networks 400 may include a first network 404, a second network 406 and a third network 408. Each network may include an RCN for the network. Additionally, there may be a CRM node for intermediating between the networks. The RCN from each network may be in communication with the CRM node for enabling nodes from one network to communicate securely with nodes from another network.

In some embodiments, RCN 404, 406 and 408 may be in direct communication with each other for authenticating communication between networks. In some embodiments, CRM node 402 may be the only node that may authenticate communication between networks.

Figure 5:
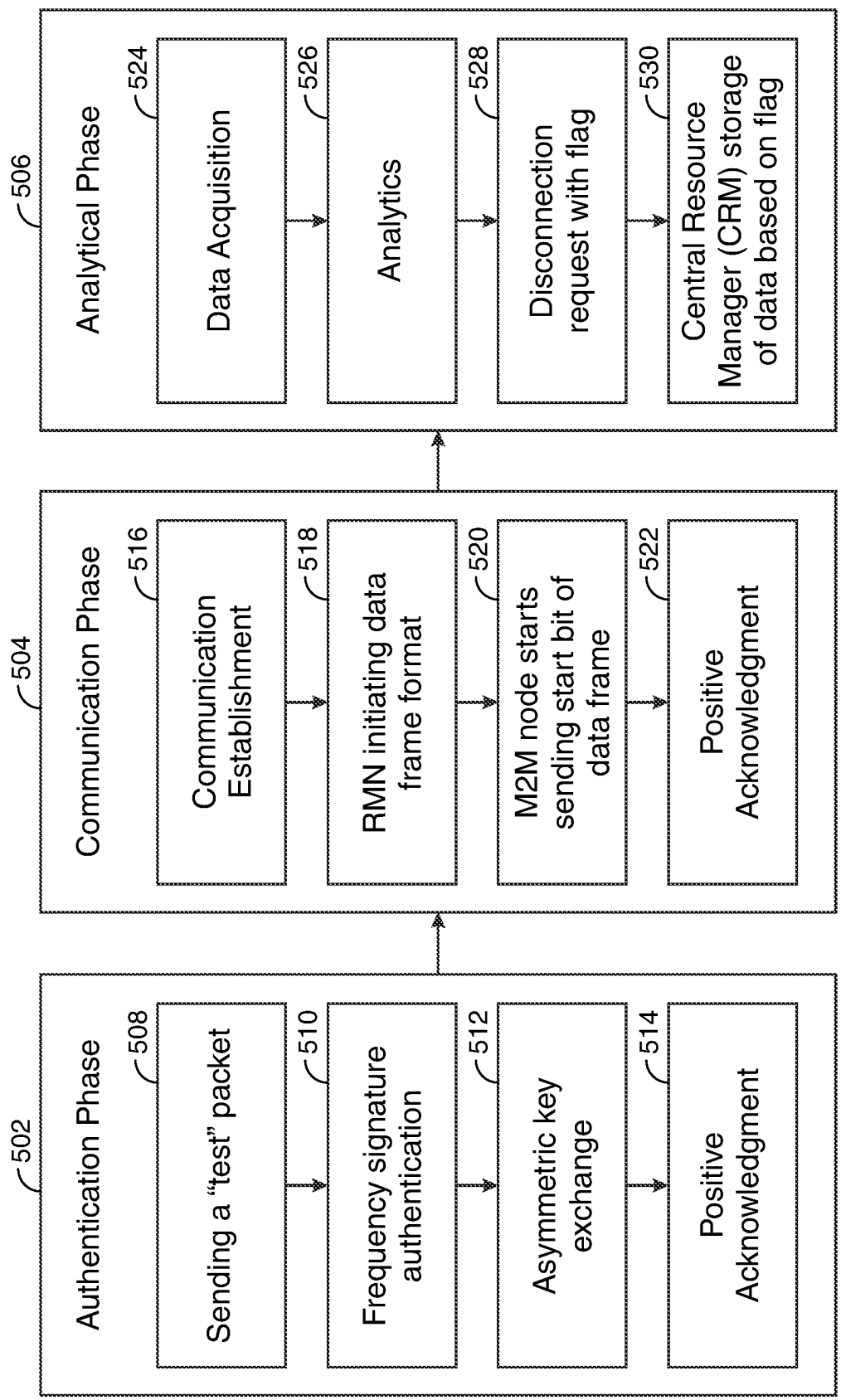
FIG. 5 shows an illustrative flow diagram in accordance with principles of the disclosure.

FIG. 5 shows an illustrative flow diagram of the phases for authentication of nodes in a network in accordance with principles of the disclosure.

In this illustrative diagram there may be three phases for operating an M2M communication model for a plurality of nodes within a network.

The three phases may include an authentication phase 502, a communication phase 504 and an analytical phase 506.

At authentication phase 502, the node may transmit a test packet to the RCN, as shown at 508. The test packet may include a frequency signature for authentication 510. Additionally, an asymmetric key exchange 512 may be performed for authentication.

It should be appreciated that the authentication using a combination of both the frequency signature and asymmetric key algorithms may further increase the security of the network.

Upon authentication of the frequency signature and asymmetric key exchange, a positive authentication 514 may occur and the node may be enabled to communicate with the RCN.

At communication phase 504, communication may be established between the node and the RCN, as shown at 516. The node may transmit a data payload in a specific frame format, as shown at 518. The format may be compared to the format generated by the network for further authentication. In response to authentication, step 520 may be performed. The RCN may transmit network protocol to the node that may include a length of the data payload, a start bit position and how the data may be segregated. This may enable a significant increase in interoperability.

At 522 a positive acknowledgment may be communicated between node and the RCN.

At analytical phase 506, data acquisition 524 may be performed. Analytics 526 may also be performed. The data acquisition and analytics may be performed to securely perform the disconnect between nodes. Following, at 528, a handshaking signal for disconnection may be transmitted to the RCN. A flag that may include the privacy level of the data may also be transmitted. Based on the privacy level, the data may be handled in a plurality of ways. In some embodiments, the data may be deleted. In some embodiments the data may be stored temporarily in the RCN database. In some embodiments, the data may be transmitted to cloud storage for permanent data acquisition, as shown at 530.

Thus, systems and methods for supporting machine to machine communication within a network of nodes are provided. Persons skilled in the art will appreciate that the present invention can be practiced by other than the described embodiments, which are presented for purposes of illustration rather than of limitation.

What is claimed is:

1. A network of nodes supporting machine to machine ("M2M") communication within the network, the network comprising:
   a plurality of nodes, the plurality of nodes including a first node, each node being in an inactive communication state for communicating with one or more of the plurality of nodes prior to authentication of each node with a remote central node ("RCN");
   wherein, the RCN is configured to control authentication and communication between the first node and each of the remaining nodes in the plurality of nodes by:
      at an authentication phase of the first node:
         receiving a frequency signature from the first node;
         verifying that the frequency signature corresponds to a network frequency signature; and
         in response to the verifying, authenticating the first node; and
      at a pre-communication phase following the authentication phase:
         receive a data payload from the first node, the data payload comprising a frame format;
         verify that the frame format corresponds to a network frame format;
         in response to the verifying, transmitting a communication network protocol to the first node, the communication network protocol comprising:
            a start bit position;
            a length of the data payload; and
            a mode of data segregation; and
         transmitting an activation key to the first node, the activation key switching the first node from the inactive communication state to an active communication state;
      at a communication phase, following the pre-communication phase, the first node being configured to transmit a communication request from the first node to a second node included in the plurality of nodes, the communication request comprising the activation key;
      at the communication phase, the second node being in the inactive communication state, the second node being configured to:
         receive the communication request from the first node;

transmit the activation key to the RCN for verification;
in response to a receipt of verification from the RCN, the second node is in the active communication state;
establish the communication with the first node; and
store data comprised in each communication at an RCN database; and
the RCN being further configured to, at a disconnect phase following the communication phase:
receive from the first node a disconnect signal and a flag comprising a data privacy level of the data in each communication;
when the data privacy level is greater than a pre-determined threshold, delete the data from the RCN database;
when the data privacy level is less than the pre-determined threshold, store the data in the RCN database for a pre-determined time period; and
switch a state of the first node and the second node from the active communication state to the inactive communication state.

2. The network of nodes of claim 1 wherein when the frequency signature does not correspond to the networks frequency signature, the RCN is configured to deny communication with the first node.

3. The network of nodes of claim 2 wherein prior to denying communication with the first node, the RCN is further configured to:
identify a media access control ("MAC") address of the first node;
identify a unique identifier ("ID") for the first node;
store the unique ID and MAC address in the RCN database; and
flag the unique ID and MAC address as an unidentifiable node.

4. The network of nodes of claim 1 wherein following a lapse of a pre-determined period of storing the data in the RCN database, the RCN is configured to delete the data from the RCN database and transmit the data to a cloud for permanent data storage.

5. The network of nodes of claim 1 wherein the authenticating further comprises running an asymmetric key algorithm to verify the node.

6. The network of nodes of claim 1 wherein each node in the plurality of nodes is a computing device.

7. The network of nodes of claim 6 wherein each node in the plurality of nodes is an internet of things ("IoT") device.

8. The network of nodes of claim 1 wherein the first node maintains the active communication state for a pre-determined duration of time.

9. The network of nodes of claim 1 wherein the first node, when in the active communication state, is configured to communicate with the second node and each of the plurality of nodes in the network.

10. The network of nodes of claim 8 wherein following the pre-determined duration of time, the first node is automatically reverted to the inactive communication state.

11. The network of nodes of claim 1 wherein the network frame format is a format generated by the network for use in communication between each of the plurality of nodes.

12. The network of nodes of claim 1 wherein the network frequency signature is an RFID tag.

13. A plurality of networks supporting machine to machine ("M2M") communication, each of the plurality of networks comprising a plurality of nodes, the plurality of networks comprising:
a first network comprising a first plurality of nodes;
a second network comprising a second plurality of nodes;
a third network comprising a third plurality of nodes;
a remote central network ("RCN") for each of the plurality of networks, the RCN configured to, for each of the plurality of networks, authenticate each of the plurality of nodes prior to communicating with a node from another network; and
a central resource manager ("CRM") node for authenticating the RCN for each of the plurality of networks, the CRM node as a communication gateway between each RCN;
wherein, prior to a second node from the second network receiving and acknowledging a communication transmitted by a first node from the first network:
a first RCN from the first network is configured to authenticate the first node, the authenticating by the first RCN comprises:
at an authentication phase of the first node:
receiving a frequency signature from the first node;
verifying that the frequency signature corresponds to a network frequency signature of the first network; and
in response to the verifying, authenticating the first node; and
at a pre-communication phase following the authentication phase:
receive a data payload from the first node, the data payload comprising a frame format;
verify that the frame format corresponds to a network frame format of the first network;
in response to the verifying, transmitting a communication network protocol to the first node, the communication network protocol comprising:
a start bit position;
a length of the data payload;
a mode of data segregation; and
transmitting an activation key to the first node, the activation key switching the first node from an inactive communication state to an active communication state; and
transmitting the data payload and first RCN identifying data to the CRM node, the CRM node for authenticating the first RCN;
the CRM node, following receipt of the data payload and the first RCN identifying data, is configured to authenticate the first RCN;
in response to the authenticating of the first RCN, the CRM node is configured to transmit node identifying data of a second RCN associated with the second node to the first RCN;
the first RCN, following receipt of the node identifying data, is configured to transmit the data payload to the second RCN for transmittal to the second node; and
following receipt of the data payload at the second node, communication between the first node and the second node is established.

14. The plurality of networks of claim 13 wherein the authenticating of the RCN via the CRM node comprises running an asymmetric key algorithm to verify the RCN.

15. The plurality of networks of claim 13 wherein when the frequency signature does not correspond to the network frequency signature of the first network, the first RCN is configured to deny authentication of the first node.

16. The plurality of networks of claim 15 wherein prior to denying authentication of the first node, the RCN is further configured to:

identify a MAC address of the first node;
identify a unique identifier ("ID") for the first node;
store the unique ID and MAC address in an RCN database; and
flag the unique ID and MAC address as an unidentifiable node.

17. The plurality of networks of claim 16 wherein the RCN is further configured to transmit the unique ID and MAC address to the CRM node for storing as the unidentifiable node.

18. The plurality of networks of claim 13 wherein when communication is established between the first node and the second node, the first node is further enabled to communicate with each of the remaining nodes in the second network.

19. The plurality of networks of claim 13 wherein the authenticating of the first RCN comprises verifying that the network frequency signature corresponds to a frequency signature of the CRM node.

20. The plurality of networks of claim 13 wherein the authenticating of the first RCN comprises using an asymmetric key algorithm to authenticate the first RCN.

\* \* \* \* \*